March 9, 1954 R. O. SOFFEL 2,671,824

ELECTRON BEAM REGISTER SIGNALING SYSTEM

Filed Dec. 2, 1949 3 Sheets-Sheet 1

FIG. I

INVENTOR
R.O.SOFFEL
BY
R.O. Covell
ATTORNEY

ELECTRON BEAM REGISTER SIGNALING SYSTEM

Filed Dec. 2, 1949 3 Sheets-Sheet 2

INVENTOR
R.O. SOFFEL
BY R. O. Covell
ATTORNEY

March 9, 1954 R. O. SOFFEL 2,671,824

ELECTRON BEAM REGISTER SIGNALING SYSTEM

Filed Dec. 2, 1949 3 Sheets-Sheet 3

INVENTOR
R. O. SOFFEL
BY
R. O. Covell
ATTORNEY

Patented Mar. 9, 1954 2,671,824

UNITED STATES PATENT OFFICE 2,671,824

ELECTRON BEAM REGISTER SIGNALING SYSTEM

Robert O. Soffel, Hastings-on-Hudson, N. Y., assignor to Bell Telephone Laboratories, Incorporated, New York, N. Y., a corporation of New York Application December 2, 1949, Serial No. 130,687

5 Claims. (Cl. 179—16)

Figure 1:
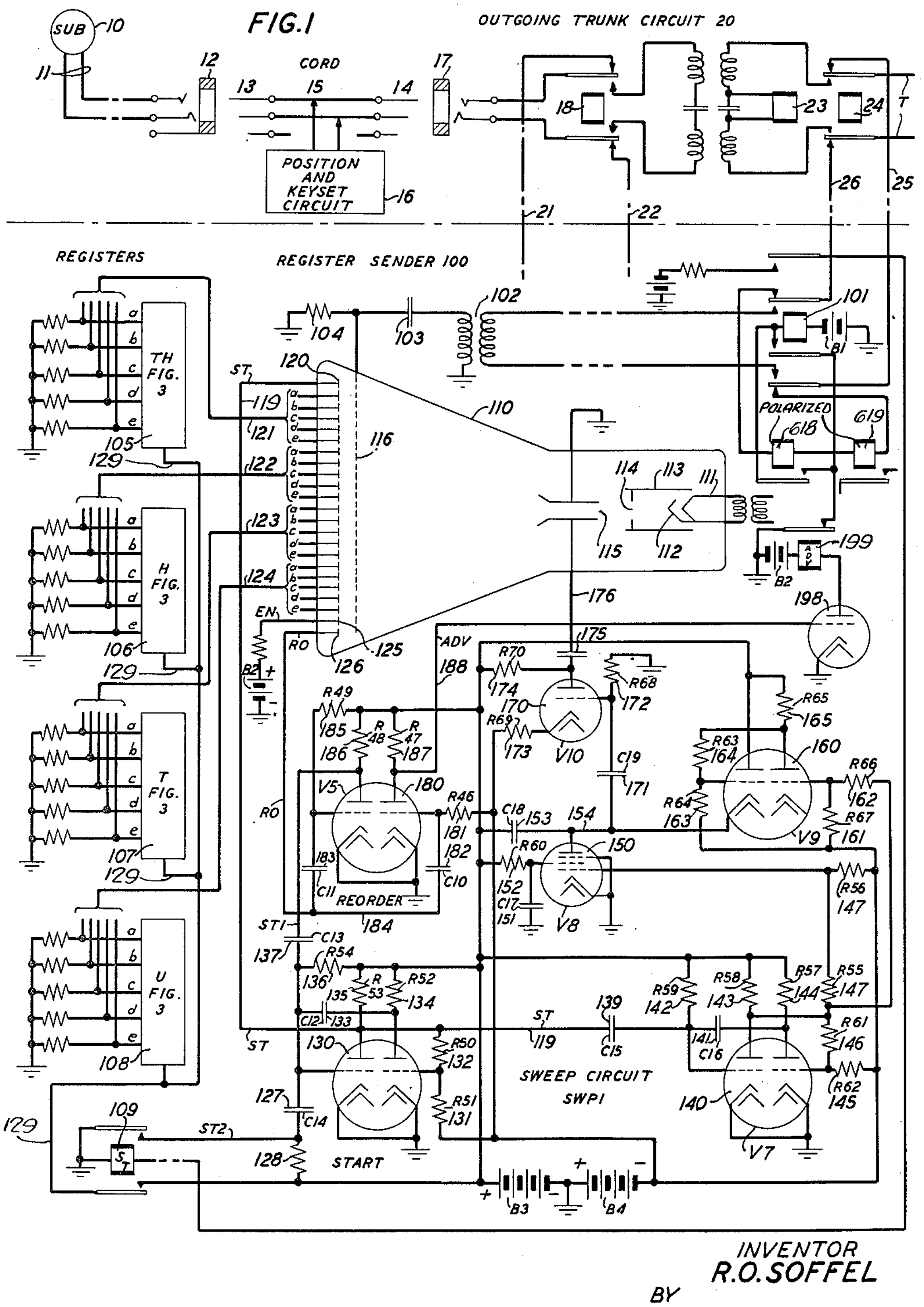

This invention relates to signaling and in particular to signaling systems suitable for use in transmitting a plurality of letter and numerical digits corresponding to telephone directory or other routing numbers for controlling the establishment of desired communication connections in telephone systems.

Objects of the invention are the rapid and accurate transmission of letter and numerical digits over interoffice trunks in automatic telephone systems, the synchronization of the signal transmitting and receiving means, and the transmission of signals back over a trunk to indicate that the signals have been received or that the signals should be repeated.

This invention is exemplified in a two-way signaling arrangement comprising like electron beam multitarget tubes connected to the ends of an interconnecting signal transmitting medium or channel.

A feature of the invention is a signaling arrangement in which an electron beam tube connected to one end of a trunk transmits coded letter and digit signals over a trunk to a similar electron beam tube. Another feature of the invention is the transmission of a starting impulse from the digit sending tube to the digit receiving tube at the beginning of a series of signals to synchronize the sending and receiving tubes, the beam of both tubes being normally focussed on a particular electrode which constitutes a start position for each sweep of the beam. Another feature of the invention is the transmission of an end impulse from the digit sending tube after all of the letter and numerical digits have been sent. Another feature is the transmisson of a reorder signal impulse from the digit receiving tube to the digit sending tube if any received digit signal appears to be incomplete or incorrect and the transmission of a different signal if all received digit signals appear to be complete and correct.

Figure 2:
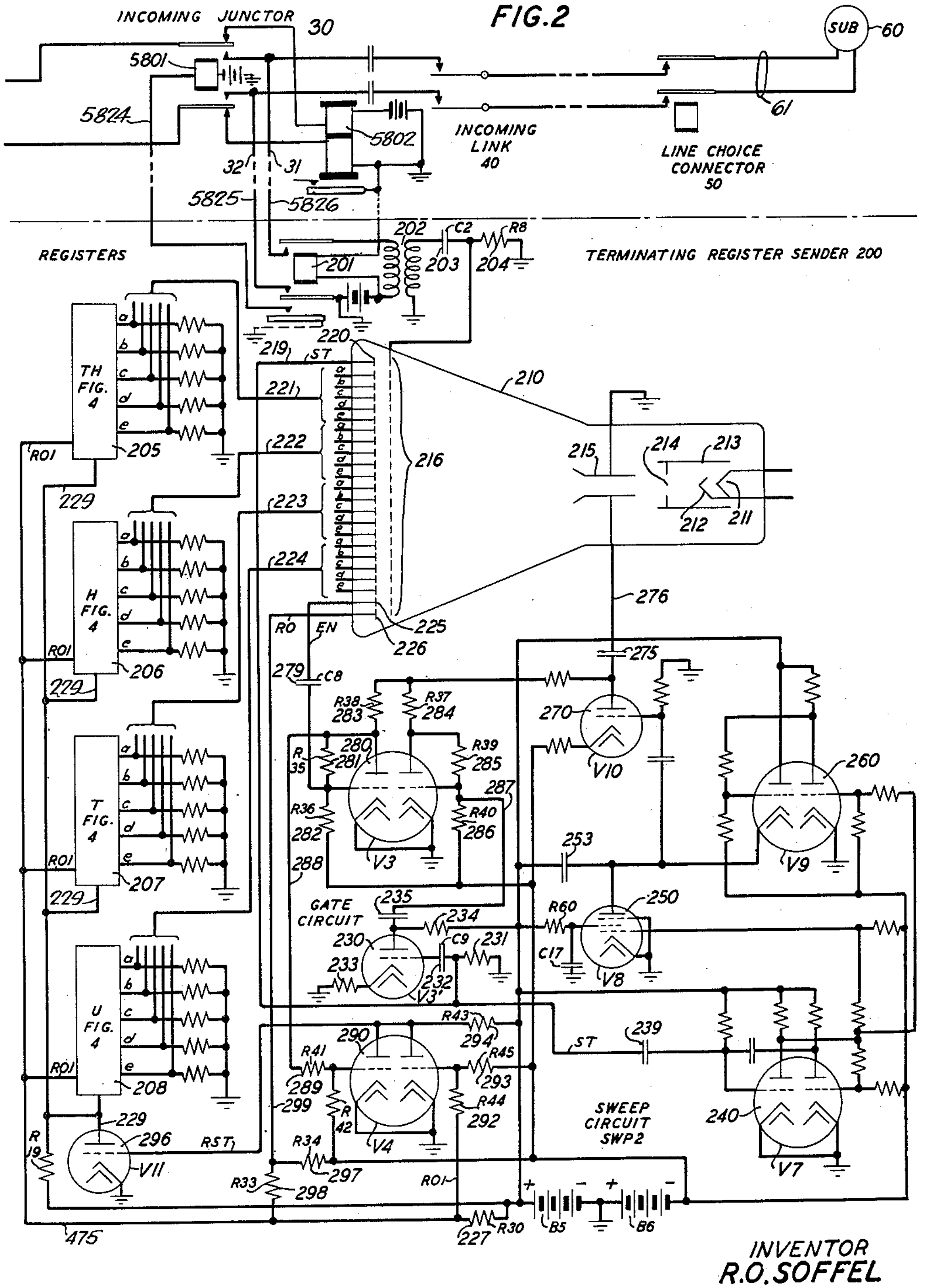
Figure 3:
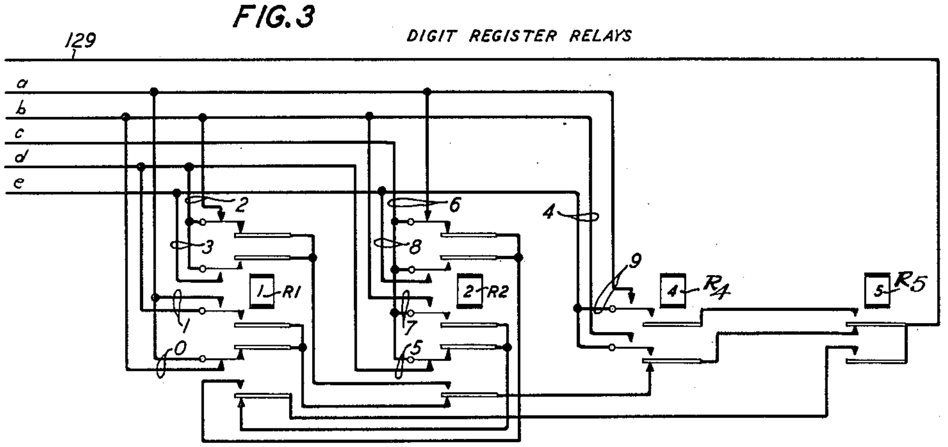
Figure 4:
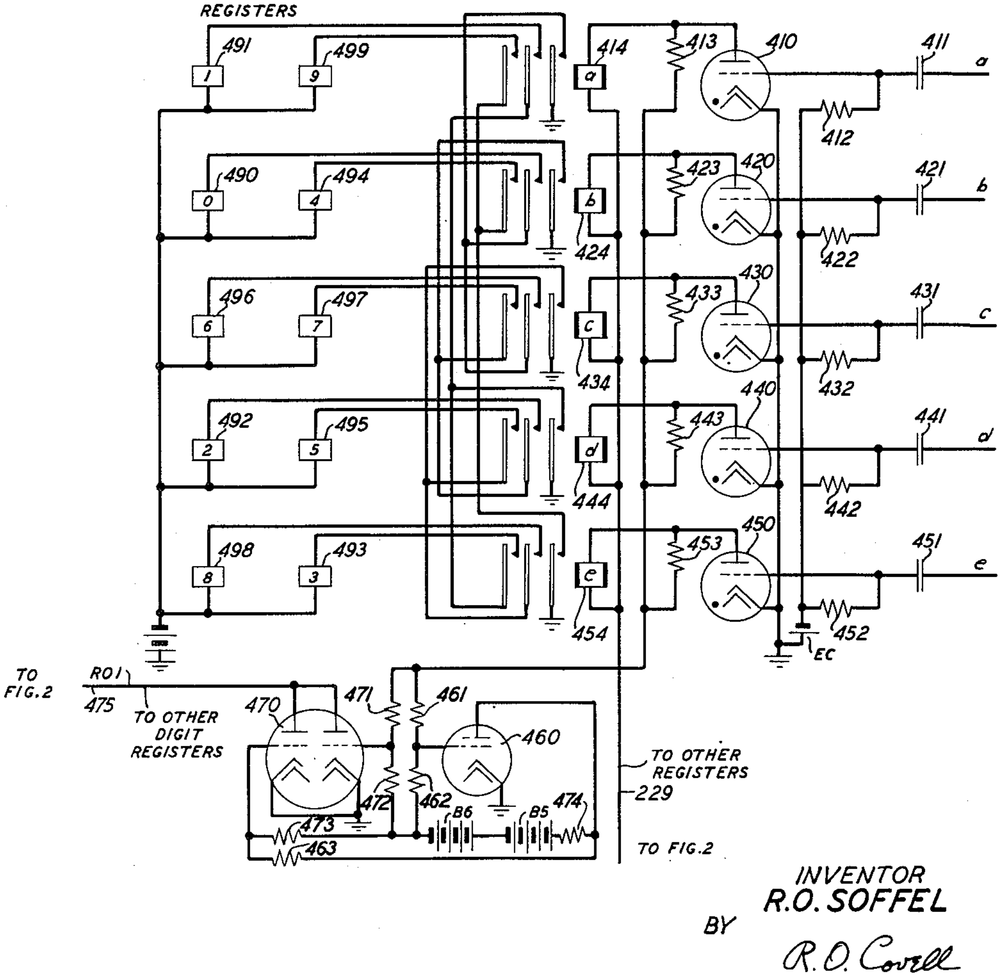

A clear and complete description of these and other features of the invention will be facilitated by referring to the telephone system and signaling arrangement disclosed schematically in the drawing which consists of four figures. Referring to the drawing:

Fig. 1 shows in a first central office a subscriber station 10 and line 11, an operator position comprising a cord 15 and a position circuit 16 including a key-set, an outgoing trunk circuit 20 connected to one end of a trunk T, and a register-sender 100 for registering the number keyed by an operator and for controlling the transmission of the registered number over the trunk T;

Fig. 2 shows in a second central office comprising automatic switching equipment of the cross bar type, an incoming junctor 30 individual to the trunk T, an incoming link 40, a line choice connector 50, a subscriber line 61 and station 60 and a terminating register-sender 200;

Fig. 3 shows one of the four sets of digit registering relays in the register-sender 100 arranged for controlling the transmission of digit signals by the tube 110 in this sender; and Fig. 4 shows one of the four digit registers in the register-sender 200 arranged for control by signals received by the tube 210 in this sender.

The subscriber station 10 may be of known type and be connected by line 11 to a manual or automatic type local central office which is not shown in the drawing. The jack 12 terminates an incoming trunk from the local central office at a toll operator position 16 equipped with a plurality of cords 15 for answering and extending calls and with a ten-key numerical key-set which is used when the call is being extended over an outgoing trunk to an automatic type central office. One such outgoing trunk T is shown, the associated outgoing trunk circuit 20 being connected to a jack 17 at the toll operator position 16. The trunk circuit 20 is shown schematically including the talking transmission path, the conductors 21 and 22 through which key pulsing signals are transmitted from the operator key-set to be registered in a register-sender 100, and the conductors 25 and 26 through which selective signals are transmitted over the trunk T to the automatic central office to register the called number in that office. Reference may be had to Patent 1,916,760, granted July 4, 1933, to I. H. Henry for description of the operator key-set and outgoing trunk circuits and also for description of a link circuit (not shown) through which the trunk circuit 20 is connected to an idle register-sender circuit 100 when a cord 15 is connected with jack 17. The conductors 21, 22, 25 and 26 correspond to conductors 311, 313, 306 and 308 respectively of the trunk circuit shown in Fig. 3 of the Henry patent. The register-sender 100 is a modification of the register-sender shown in the Henry patent. The registers 105, 106, 107 and 108 are similar to the thousands, hundreds, tens and units registers in the Henry patent and are set under the control of the operator key-set in similar manner to that described for the corresponding registers in the Henry patent; and Fig. 3 shows the register relays, which are provided for each register, with contacts arranged to control the sending of any digit registered. The four register relays R1, R2, R4 and R5 are of the known additive indication type, relay R1 being operated to register the digit one, relay R2 to register the digit two, relays R1 and R2 both being operated to register the digit three and so on.

The automatic local central office in which the trunk T terminates is shown as being of the cross bar type, the trunk T being connected to an incoming junctor 30. The incoming junctor 30, incoming link 40 and line choice connector 50 are not shown in complete detail but reference may be had to Patent 2,089,921 granted to W. W. Carpenter August 10, 1937, for a complete disclosure of similar cross bar type switching equipment. In the Carpenter patent an incoming junctor is shown in Fig. 58 and an incoming link and connector are shown in Fig. 57. Relay 5801 of incoming junctor corresponds to the like identified relay in the Carpenter patent. The conductors 31 and 32 correspond to conductors 5826 and 5825 respectively of the incoming junctor shown in Fig. 58 of the Carpenter patent and transmit the selective signals incoming over trunk T to a terminating register-sender 200 which is associated by a link circuit (not shown) with the incoming junctor upon seizure of trunk T by connection of a cord 15 to jack 17 in the toll office. The register-sender 200 is a modification of the terminating sender disclosed in Figs. 29, 30 and 37 of the Carpenter patent and includes registers 205, 206, 207 and 208, the settings of which are used by a terminating marker (not shown) in the manner described in the Carpenter patent to control extension of connections through links 40 and connectors 50 to called subscriber lines.

The register-senders 100 and 200 are arranged for selective signaling in accordance with applicant's invention instead of in the manner described in either of the aforementioned Henry and Carpenter patents, and the signaling means in each of these register-senders is shown and described herein in detail. A multitarget electron beam tube is provided in each of the senders, the tube 110 of register-sender 100 being effective to transmit the called number over trunk T under the control of registers 105, 106, 107 and 108; and the tube 210 of register-sender 200 being operatively responsive to the digit signals incoming over trunk T to set the registers 205, 206, 207 and 208, each of which is similar to the register shown in Fig. 4. The tube 110 in register-sender 100 comprises an evacuated enclosing vessel having at the right end a cathode 112, cathode heating filament 111, and a beam forming and accelerating anode 113. The concentrated electron beam passes out through the aperture 114 of anode 113 toward the left and centrally between deflection plates 115 through apertures in a shield electrode 116 to engage the target anodes mounted at the left end of the tube. The mounting of the various elements within the evacuated vessel and the leading-in conductors are not shown; but reference may be had to Patent 2,452,157, granted to R. W. Sears, October 26, 1948, for a complete disclosure of the structure of such a tube. Each of the target anodes is made of, or is coated with, a material which readily emits electrons when energized by the electron beam; and the shield electrode 116 is maintained at a positive potential with respect to each of these anodes so as to act as a collector of the electrons emitted from the target anodes. The tube is normally biased so that the beam is engaging the start anode 120. A linear sweep circuit comprising tubes 140, 150, 160 and 170 controls the movement of the beam to step from the start anode 120 and successively engage each of twenty intermediate anodes, the potential of which is controlled by registers 105, 106, 107 and 108, an end-of-code anode 125 and a reorder anode 126 and to then return to and rest on the start anode 120. The twenty intermediate anodes form four groups 121, 122, 123 and 124 of five anodes each. The anodes *a*, *b*, *c*, *d* and *e* of group 121 are connected to the thousands digit register 105, as shown in Fig. 3; the anodes *a*, *b*, *c*, *d* and *e* of group 122 are connected to the hundreds digit register 106, the anodes *a*, *b*, *c*, *d* and *e* of group 123 are connected to the tens digit register 107; and the anodes of group 124 are connected to the units digit register 108. A start circuit comprising thermionic tube 130 controls the starting of the operation of sweep circuit SWP1 when the registers have been set; and an advance or reorder circuit comprising vacuum tube 180 responds to an advance signal to effect release of the register-sender 100 and responds to a reorder signal received over trunk T to effect the starting of the sweep circuit to repeat the sending of the code corresponding to the set registers in case the coded digit signals are not properly received and registered in the cross bar office.

The tube 210 in register-sender 200 is similar in structure to that of tube 110 and reference numbers of corresponding elements have the same tens and units digits. The tube is normally biased so that the electron beam tube is engaging the start anode 220. The linear sweep circuit SWP2 comprising thermionic tubes 240, 250, 260 and 270 controls the movement of the electron beam to step from the start anode 220 and successively engage each of twenty intermediate target anodes, an end-of-code anode 225 and a reorder anode 226 and then back to rest on the start anode 220. The twenty intermediate target anodes form four groups of five anodes each. The anodes *a*, *b*, *c*, *d* and *e* of group 221 are connected to control the operation of the thousands digit register 205 as shown in Fig. 4; the anodes *a*, *b*, *c*, *d* and *e* of group 222 are connected to control the operation of the hundreds digit register 206; the anodes *a*, *b*, *c*, *d* and *e* of group 223 are connected to control the operation of the tens digit register 207; and the anodes *a*, *b*, *c*, *d* and *e* of the group 224 are connected to control the operation of the units digit register 208. A gate circuit comprising thermionic tubes 230, 280 and 290 controls the resetting of the registers and each register controls the sending of an advance or a reorder signal over trunk T depending upon whether each of the registers is operated to indicate receipt of a complete and correct code.

The further explanation of the operation of the system will be facilitated by assuming that a call is originated at subscriber station 10 and that the called station is station 60 in the cross bar office. Assume further that the line 11 of station 10 has been connected by switching means, not shown, to the jack 12 in the toll office and by a cord 15 and jack 17 to outgoing trunk circuit 20, that a register sender 100 has been connected to trunk circuit 20, and that the toll operator's key-set 16 has been operated to transmit key-set signals over conductors 21 and 22 to set the thousands, hundreds, tens and units digit registers 105, 106, 107 and 108 in the manner described in the aforementioned Henry patent. Assume further that the number thus registered is the number 1379, as described in the Henry patent. Whereby, in register 105, relay R1 is operated; in register 106, relays R1 and R2 are operated; in register 107, relays R2 and R5 are operated; and, in register 108, relays R4 and R5 are operated. When the register-sender 100 is connected to trunk circuit 20, the windings of relays 618 and 619 (which correspond to like identified relays in the aforementioned Henry patent) are connected in series through conductors 25 and 26 across the conductors of trunk T, thereby constituting a seizure signal which effects the operation of relay 5802 of incoming junctor circuit 30, thereby to extend the trunk through conductors 31 and 32 and a link circuit (not shown) to an idle register-sender circuit 200 in the manner described in the aforementioned Carpenter patent. Relays 618 and 619 are polarized in opposite directions, relay 619 being operated at this time and relay 618 remaining non-operated. The operation of relay 619 performs no useful function at this time. When an idle register-sender 200 is seized and connected to junctor 30, a relay 201 in the register-sender (which relay corresponds to relay 3700 in the Carpenter patent) and relay 5801 of the junctor are operated in the manner described in the Carpenter patent, thereby connecting trunk T through conductors 31 and 32 to the left winding of coil 202. The trunk T is thereby inductively connected to the shield electrode of signal tube 210, at the same time causing the operation of polarized relay 618 and release of relay 619 of register-sender 100. The coil 202 and windings of relays 618 and 619 are designed so as not to initiate transients which might effect the starting of sweep circuit SWP2. The operation of relay 618 closes a circuit for operating relay 101. Relay 101 locks independently of relay 618 under control of relay 199 and connects the conductors of trunk T through conductors 25 and 26 to the left winding of coil 102 whereby a signal transmitting path is inductively completed between trunk T and the shield electrode 116 of tube 110. When the registers 105, 106, 107 and 108 have been set by key pulsing signals from the operator key-set and relay 618 has operated to indicate connection of trunk T to a register-sender 200 in the terminating office, a circuit is closed for operating start relay 109. When relay 109 operates, it connects battery B3 to conductor 129 of registers 105, 106, 107 and 108. With relay R1 operated in register 105, this positive battery potential is connected to anodes *a* and *d* in group 121; with relays R1 and R2 operated in register 106, the positive potential is connected to anodes *d* and *e* in group 122; with relays R2 and R4 operated in register 107, the positive potential is connected to anodes *a* and *c* in group 123; and with relays R4 and R5 operated in register 108, the positive potential is connected to anodes *a* and *e* in group 124. The various codes for all digits of each register are as follows:

| Digit | Register relays operated | Positive potential connected to anodes |
|---|---|---|
| 1 | R1 | *a* and *d*. |
| 2 | R2 | *b* and *d*. |
| 3 | R1 and R2 | *d* and *e*. |
| 4 | R4 | *b* and *e*. |
| 5 | R5 | *c* and *d*. |
| 6 | R1 and R5 | *a* and *c*. |
| 7 | R2 and R5 | *b* and *c*. |
| 8 | R1, R2 and R5 | *c* and *e*. |
| 9 | R4 and R5 | *a* and *e*. |
| 0 | None | *a* and *b*. |

Normally there is no current between the anode and cathode of tubes 150 and 170 and no current between the anode and cathode of the right triode of tubes 130, 140, 160 and 180, since in each case the control grid is negative with respect to the cathode; but the control grid of the left triode of each of tubes 130, 140, 160 and 180 is normally positive with respect to the cathode and there is, therefore, current between the anode and cathode of each of these triodes. When relay 109 operates, the connection of ground to the junction between resistor 128 and condenser 127 causes the grid of the left triode of tube 130 to become less positive with respect to the cathode thereby stopping the current between the anode and cathode. The anode of the left triode of tube 130 thereupon becomes more positive and so also does the grid of the right triode, thereby starting current between the anode and cathode of the right triode. The anode of the right triode of tube 130 then becomes less positive due to the voltage drop in resistor 134 and condenser 133 charges through resistor 136. When the charge on condenser 133 reaches a predetermined value, the grid of the left triode is sufficiently positive to again start current between the anode and cathode of the left triode, whereby the anode of the left triode becomes less positive and so also does the grid of the right triode, thereby stopping the current between the anode and cathode of the right triode. When the anode of the left triode of tube 130 becomes more negative, at the end of the above-described cycle of operation resulting from operation of the start relay 109, the grid of the left triode of tube 140 likewise becomes more negative, thereby stopping the current between the anode and cathode. It is the function of tube 130 and its above-described cycle of operation to delay the application of a start impulse to the sweep circuit when a reorder signal is received by tube 180, as hereinafter described; but the delay thus introduced immediately following the operation of relay 109 is without utility.

Since the beam of tube 110 is resting on the start anode 120 at the time that the anode of the left triode of tube 130 again becomes negative following operation of relay 109 as above described, a negative current impulse is transmitted through anode 120 and shield electrode 116 to ground through resistor 104 in parallel with condenser 103 and the left winding of induction coil 102; whereby a start signal is transmitted by the right winding of coil 102, through front contacts of relay 101, conductors 25 and 26, back contacts of relay 24, over the conductors of trunk T, through front contacts of relay 5801 of the incoming junctor 30, conductors 31 and 32, front contacts of relay 201 and the left winding of induction coil 202. A start impulse is thus transmitted from the right winding of coil 202 through condenser 203, shield electrode 216, start anode 220 on which the beam of tube 210 is resting, conductor 219 and condenser 239 to make the grid of the left triode of tube 240 less negative and thus start the operation of the sweep circuit SWP2 which is similar to the sweep circuit SWP1. Thus the operation of sweep circuit SWP2 is started a very short interval of time after sweep circuit SWP1 is started, the length of this interval being the time required for transmission of the start impulse from anode 120 of tube 110 to anode 220 of tube 210.

Returning now to describe the operation of sweep circuit SWP1, the negative start impulse, applied to start conductor 119 and through condenser 139 to render the grid of the left triode of tube 140 more negative, stops the current between the anode and cathode. When current stops between the anode and cathode of the left triode of tube 130, the anode becomes more positive and so also does the grid of the right triode of tube 140, thereby starting current between the anode and cathode of the right triode. The anode of the right triode of tube 140 thereupon becomes less positive due to the voltage drop through resistor 144 and condenser 141 starts to charge. At the end of a predetermined interval of time, the voltage across condenser 141 renders the grid of the left triode of tube 140 more positive to again start current between the anode and cathode of the left triode. The left anode of tube 140 thereupon becomes more negative and so also the right grid thereby stopping the current between the anode and cathode of the right triode. When the right grid of tube 140 became more positive to start current through the anode and cathode of tube 140 as above described, the grid of tube 150 and the grid of the right triode of tube 160 also become sufficiently positive to start current between the anode and cathode of tube 150 and to start current between the anode and cathode of the right triode of tube 160. The right anode of tube 160 thus becomes more negative and so also does the left grid of tube 160, thereby stopping current between the anode and cathode of the left triode of tube 160; whereupon condenser 153 is charged in the anode-cathode circuit of tube 150. Being a pentode, the tube 150 is a substantially constant current device and the charge on condenser 153 will increase linearly with time. The voltage across condenser 153 is applied through condenser 171 to the grid of amplifier 170, which is biased half way to cut-off. Since the anode of tube 170 is connected through condenser 175 to the deflecting plates 115 of tube 110, the voltage of the deflecting plates is changed linearly to cause the electron beam of tube 110 to sweep at a constant and desired rate from the start anode across each of the twenty intermediate target anodes and across the anode 125 coming to rest on anode 126. This sweep of the electron beam will be completed while condenser 141 is charging; and when the left triode of tube 140 is again energized, the right triode of tube 140 is deenergized, the right triode of tube 160 is deenergized, the left triode of tube 160 is again energized to shunt condenser 153, the grid of tube 170 becomes more negative, the voltage across condenser 175 is restored to normal and the electron beam is restored to normal position resting on the start anode 120.

In response to the start impulse received over trunk T and applied through shield 216, start anode 220 of tube 210 and condenser 239 to the grid of the left triode of tube 240 of sweep circuit SWP2, the sweep circuit SWP2 operates to sweep the electron beam of tube 210 from start anode 220 across the intermediate target anodes to come to rest on anode 226 in the same manner that sweep circuit SWP1 operates to sweep the electron beam of tube 100 as above described. The timing of the various circuit elements in sweep circuit SWP2 is the same as that of the corresponding elements in sweep circuit SWP1 so that the beam of tube 210 sweeps over the target anodes at the same rate that the beam of tube 110 sweeps over the target anodes of tube 110. The negative start impulse received over trunk T while the beam of tube 210 is resting on target anode 220 is also applied through condenser 232 to the grid of tube 230, thereby producing an inverted and amplified impulse in the anode-cathode circuit; and this positive impulse is applied through condenser 235 to the grid of the right triode of tube 280, starting current between the right anode and cathode and stopping current between the left anode and cathode. When the left triode of tube 280 is thus deenergized, the left anode becomes positive and so also does the grid of the left triode of tube 290; thereby starting current between the left anode and cathode of tube 290. The left anode of tube 290 thereupon becomes negative and so also does the grid of tube 296 so as to deenergize the anode-cathode circuit of tube 296. As long as tube 296 is conducting, the anode of this tube is negative and so also is the battery supply conductor 229 which is connected to the gas-filled tubes of each of the registers 205, 206, 207 and 208; but when tube 296 is deenergized responsive to receipt of the start impulse, conductor 229 becomes positive to enable the energization of the registers responsive to the code impulses which follow the start impulse.

As the beam of tube 110 successively sweeps over the five target anodes of each of groups 121, 122, 123 and 124, a positive impulse is transmitted over trunk T each time the beam impinges on an anode on which a positive potential is at that time impressed, and each impulse thus transmitted will be received through coil 202 and a positive potential impressed on shield electrode 216 when the beam of tube 210 impinges on each of the anodes of tube 210 corresponding to the anodes of tube 110 on which a positive potential is impressed as controlled by the associated registers 105, 106, 107 and 108. The impulses thus received by a target anode of tube 210 cause the operation of the associated ones of registers 205, 206, 207 and 208 in hereinafter described manner, to register the same digits registered in registers 105, 106, 107 and 108.

Each of the registers 205, 206, 207 and 208 is similar to the register shown in Fig. 4 and comprises five hot cathode, gas-filled discharge tubes 410, 420, 430, 440 and 450, the grid of each of which is connected through an individual one of condensers 411, 421, 431, 441 and 451 to one of the five target anodes in one of groups 221, 222, 223 and 224. Each gas-filled tube controls the operation of the individually associated one of relays 414, 424, 434, 444 and 454; and these relays in turn control the operation of register devices 490 to 499. If, as previously assumed herein, the number 1379 was registered on registers 105, 106, 107 and 108, signal impulses will be received by coil 202 and be transmitted to shield 216 when the beam of tube 210 engages anodes *a* and *d* in group 221, anodes *d* and *e* in group 222, anodes *b* and *c* in group 223 and anodes *a* and *e* in group 224. When the beam of tube 210 engages anode *a* of group 221, the received impulse is transmitted from shield electrode 216 through this anode and condenser 411 of register 205 to the grid of gas-filled discharge tube 410. Tube 410 is normally biased by voltage source EC through resistor 412 to be non-conducting and the other register tubes are biased in similar manner. The *a* positive impulse received and applied to the grid of tube 410 energizes tube 410 and thereby effects the operation of relay 414. When the beam engages anode *d* in group 221, the received impulse is transmitted from shield electrode 216 through this anode and condenser 441 to tube 440. Tube 440 is thereby energized and relay 444 is operated. In like manner, the impulse received while the beam engages anode *d* of group 222 effects the energization of tube 440 of register 206 and the impulse received while the beam engages anode *e* in group 222 effects the energization of tube 450 whereby relays 444 and 454 of register 206 are operated; the impulses received while the beam engages anodes *b* and *c* in group 223 effect the energization of tubes 420 and 430 and operation of relays 424 and 434 of register 207; and the impulses received while the beam engages anodes *a* and *e* in group 224 effect the energization of tubes 410 and 450 and operation of relays 414 and 454 in register 208.

Each one of the registers 205, 206, 207 and 208 also includes two thermionic tubes 460 and 470 which with resistances 413, 423, 433, 443 and 453, one for each gas-filled tube and with resistors 461 to 463 and 471 to 474 constitute a network for causing the transmission of a reorder signal in case less than two or more than two register relays are operated and for causing the transmission of an advance signal in case two and only two register relays are operated. The voltages and resistors are of such values that if less than two of the relays of a register are operated, the grid of tube 460 is positive and the grid of the right triode of tube 470 is positive, wherefore there is current between the anode and cathode of the right triode and both anodes of tube 470 are negative and so also is the reorder conductor 475. If more than two of the register relays are operated, the grid of tube 460 is negative, tube 460 is non-conducting and consequently the grid of the left triode of tube 470 is positive, wherefore the anodes of tube 470 are negative and so also is the reorder conductor 475. If, however, two and only two of the relays in a register are operated, the right grid of tube 470 is negative and the grid of tube 460 is positive so that the anode of tube 460 is negative and so also is the grid of the left triode of tube 470; wherefore the anodes of tubes 470 are positive and the reorder conductor 475 is also positive. Thus, if in each of the registers, two and two only register relays are operated, a positive potential will be impressed on conductor 475 and if more or less than two relays are operated in any of the registers, a negative potential will be impressed on conductor 475; whereby either an advance or a reorder signal will be transmitted to the originating office when the beam of tube 210 engages the anode 126 as hereinafter described.

When the beam of tube 110 engages anode 125, a positive end-of-number signal impulse is transmitted over trunk T since anode 125 is connected to the positive pole of battery B2. This end-of-number impulse is received by coil 202 and transmitted through shield electrode 216, anode 225 and condenser 279 to the grid of the left triode of tube 280 of the gate circuit. The positive impulse applied to the grid of the left triode starts current between the left anode and cathode. This anode then becomes more negative and with it the grid of the right triode thus deenergizing the right triode and making the grid of the left triode of tube 290 negative; whereby current is stopped between the anode and cathode of the left triode of tube 290. If at the time that the grid of the left triode of tube 290 becomes negative due to receipt of a positive impulse through anode 225, reorder conductor 475 is negative because more or less than two gas-filled tubes and register relays have been operated in one or more of the registers 205, 206, 207 and 208 as above described, then the anodes of tube 290 are positive and so also is the grid of tube 296; whereby there is current between the anode and cathode of tube 296, battery supply conductor 229 becomes negative and the gas-filled tubes and relays of the registers 205, 206, 207 and 208 are deenergized awaiting a repetition of the signal transmission. But if, at the time that the grid of the left triode of tube 290 becomes negative due to receipt of a positive impulse through anode 225, conductor 475 is positive because two and only two of the gas-filled tubes and register relays have been operated in each of the registers, as above described, then the anodes of tube 290 are negative, and so also is the grid of tube 296; whereby tube 296 is non-conducting and the operated gas-filled tubes and relays of registers 205, 206, 207 and 208 remain operated until another positive start impulse is received.

If, when the beam of tube 210 engages anode 226, a negative potential is being applied to conductor 475 as above described, a reorder signal consisting of a negative impulse is transmitted from conductor 475, through resistor 298, conductor 299, anode 226, shield 216, condenser 203, coil 202 over trunk T through coil 102, condenser 103, shield 116, anode 126 and condensers 182 and 183 to the grids of tube 180; but if conductor 475 is positive at this time, an advance signal consisting of a positive impulse is transmitted over trunk T to the grids of tube 180. If a reorder signal is received and the grids of tube 180 become negative, current stops between the anode and cathode of the left triode, whereby the left anode becomes positive thus transmitting a positive impulse through condenser 137 to the start circuit and the above-described operation of the start and sweep circuit is repeated to again effect the sending of the code signals as controlled by registers 105, 106, 107 and 108. If, however, an advance signal is received and the grids of tube 180 become positive, current starts between the anode and cathode of the right triode of tube 180 and relay 199 is operated. The operation of relay 199 causes the release of relay 101 thereby disconnecting coil 102 from conductors 25 and 26 and releasing relay 109 whereby battery supply conductor 129 is disconnected from battery B3. The sender 100 is thereupon released and restored to normal in usual manner.

The sender circuit 200 controls the completion of the connection from junctor 30 through the incoming link and line choice connector to the called subscriber line under the control of the registers 205, 206, 207 and 208 and is thereafter restored to normal in usual manner, all as described in the aforementioned patent to W. W. Carpenter.

What is claimed is:

1. In a signaling system, first and second multianode electron beam tubes each comprising electron beam emitting means, a plurality of secondary electron emissive target anodes, a shield electrode and deflecting plates for controlling the beam, a line, means electrically connecting one end of said line to the shield electrode of said first tube, means electrically connecting the other end of said line to the shield electrode of said second tube, means associated with each of said tubes for controlling the potential impressed on the deflecting plates to cause the electron beam to engage a first anode, and for varying the potential applied to the deflecting plates to cause the beam to sweep over each of the other anodes to a last anode at a predetermined rate and then to reengage said first anode, means at said one end of the line for impressing a signal potential on certain ones of said anodes according to any one of a plurality of different signal codes, means for impressing a start signal potential on said first anode and coincidentally starting the sweep of the electron beam, means including the shield electrode of said first tube for transmitting a start signal impulse over said line when signal potential is applied to said first anode and for transmitting a signal impulse over said line each time the beam engages another of the anodes to which signal potential is being applied, means connectable to said line at said other end of the line and including the shield electrode of said second tube responsive to the application of signal potential to said first anode of said first tube for starting the sweep of the electron beam of said second tube, signal means at said other end of the line operatively energized in response to each incoming signal impulse upon engagement of the electron beam of said second tube with an anode corresponding to an anode of said first tube to which a signal potential is impressed, and register means selectively controlled by said signal means to register a received signal code.

2. In a signaling system according to claim 1, an additional anode in corresponding position in each of said tubes next succeeding the anodes used to transmit coded signals, means for impressing a signal potential on said additional anode of said first tube to effect the transmission of an end-of-code signal when the electron beam of said first tube engages said additional anode, and electrical means responsive to said end-of-code signal while the electron beam of said second tube engages said additional anode of said second tube.

3. In a signaling system according to claim 1, means for checking the operation of said signal means at said other end of said line, means rendered effective by the operation of said checking means in case the operation of said signal means indicates receipt of no signal code other than any one of said different signal codes for applying an advance signal potential to said last anodes of said second tube thereby to effect the transmission of an advance signal over said line when the beam of said second tube engages said last anode to indicate that registration of the transmitted coded signals has been effected, signal means, and means responsive to the transmission of said advance signal through the shield and last anode of said first tube during engagement of the beam of said first tube with said last anode to operate said signal means.

4. In a signaling system according to claim 1, an additional anode in corresponding position in each of said tubes next succeeding the anodes used to transmit coded signals, means for impressing a signal potential on said additional anode of said first tube to effect the transmission of an end-of-code signal when the electron beam of said first tube engages said additional anode, and electrical gate means, means whereby said gate means responds to said end-of-code signal during the time the electron beam of said second tube engages said additional anode of said second tube, means for checking the operation of said signal means at said other end of said line and for applying a reorder signal potential to said additional anode of said second tube when the operation of said signal means indicates receipt of a signal other than any one of said different signal codes, means whereby said reorder signal potential effects the transmission of a reorder signal over said line during the engagement of the beam of said second tube with said last anode, means whereby indication of a signal other than any one of said different signal codes causes said gate means to deenergize said signal means without operating said register means, and means, including said shield and last anode of said first tube, responsive to said reorder signal upon engagement of the beam of said first tube with said last anode for causing the beam of said first tube to again sweep over said anodes to effect another transmission of said start signal, said coded signal, and said end-of-code signal.

5. In a signaling system according to claim 1, an end-of-code anode in corresponding position in each of said tubes next succeeding the anodes used to transmit coded signals, means for impressing a signal potential on said end-of-code anode of said first tube to effect the transmission of an end-of-code signal when the electron beam of said first tube engages said end-of-code anode, means for checking the operation of said signal means at said other end of said line and for applying a signal potential of one character to said last anode if the operation of said signal means indicates receipt of no signal code other than said different signal codes and for applying a signal potential of a different character to said last anode if the operation of said signal means indicates receipt of a signal code other than any one of said different signal codes, thereby to transmit either a reorder signal or an advance signal over said line during engagement of the beam of said second tube with said last anode, electrical gate means operated by said end-of-code signal when the electron beam of said second tube engages the end-of-code anode, means rendered effective responsively to operation of said gate means and controlled by said checking means to prevent operation of said register means when the operation of said signal means indicates receipt of a signal code other than any one of said different signal codes, and signal means at said one end of the line selectively operated during engagement of the beam of said first tube with said last anode responsive to the transmission of the one or the other of said reorder and advance signals through the shield and last anode of said first tube.

ROBERT O. SOFFEL.

References Cited in the file of this patent

UNITED STATES PATENTS

| Number | Name | Date |
|---|---|---|
| 2,361,766 | Hadekel | Oct. 31, 1944 |
| 2,379,221 | Espenchied | June 26, 1945 |
| 2,379,715 | Hubbard | July 3, 1945 |
| 2,415,870 | Ryder | Feb. 18, 1947 |
| 2,437,266 | Marrison | Mar. 9, 1948 |
| 2,483,400 | Clark | Oct. 4, 1949 |
| 2,534,369 | Ress | Dec. 19, 1950 |